United States Patent [19]

Kipp

[11] 4,321,602
[45] Mar. 23, 1982

[54] FREQUENCY-TRACKING FILTER, AS FOR USE IN FM-CW RADAR

[75] Inventor: Ronald W. Kipp, Croydon, Pa.

[73] Assignee: RCA Corporation, New York, N.Y.

[21] Appl. No.: 166,346

[22] Filed: Jul. 7, 1980

[51] Int. Cl.³ .............................................. G01S 13/32
[52] U.S. Cl. ..................................... 343/14; 307/520; 328/167; 343/7 PL
[58] Field of Search ............... 343/7 PL, 14; 307/520, 307/522; 328/138, 167

[56] References Cited
U.S. PATENT DOCUMENTS 4,072,947 2/1978 Johnson ................................ 343/14

OTHER PUBLICATIONS

W. Y. Elliott, Jr.; *First Order Phase-Locked Loop Data Filter;* IBM Technical Disclosure Bulletin, vol. 18, No. 10, Mar. 1976, pp. 3441–3442.

*Primary Examiner*—T. H. Tubbesing
*Attorney, Agent, or Firm*—Samuel Cohen; Robert L. Troike; Allen LeRoy Limberg

[57] ABSTRACT

The performance of a frequency-tracking filter comprising a phase-locked loop synchronized by square-wave output signal from a limiter amplifier is improved during interruptions in that signal by interposing a level discriminator between the limiter amplifier and the phase comparator element of the phase-locked loop.

3 Claims, 1 Drawing Figure

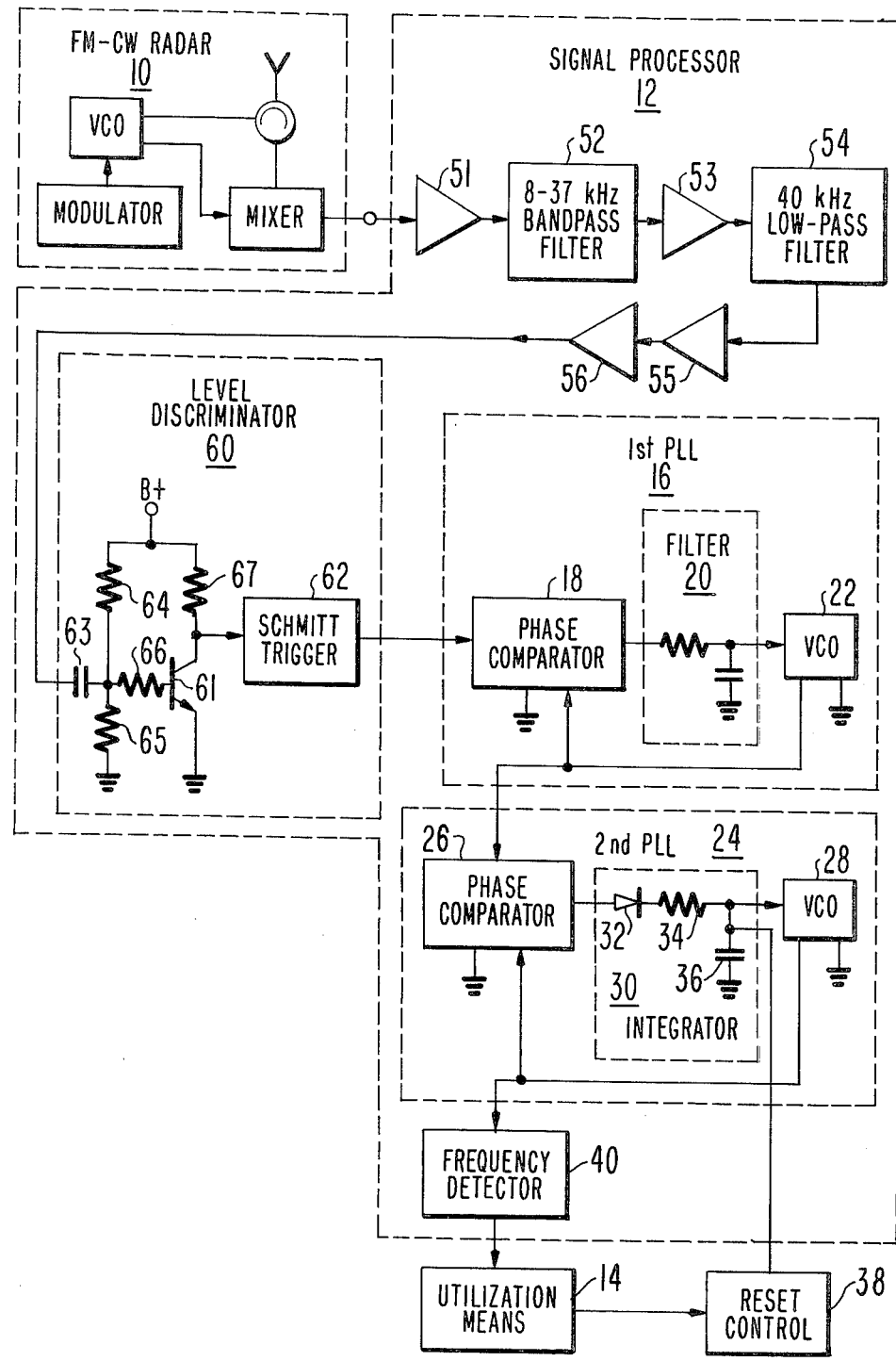

FREQUENCY-TRACKING FILTER, AS FOR USE IN FM-CW RADAR

BACKGROUND OF THE INVENTION

1. Field of the Invention

The present invention relates to continuous wave radar ranging systems and, in particular, to a signal processor for use therein.

2. Description of the Prior Art

In continuous wave (CW) radar ranging systems, a frequency modulated interrogation signal is transmitted toward a target and is reflected therefrom back to the interrogating unit. The reflected signal is received by the interrogating unit, mixed with a sample of the interrogation signal, and filtered to obtain a difference signal. The finite distance or range between the interrogating unit and the target introduces a round trip delay $\tau$ between the return signal and the instantaneous interrogation signal sample. Expressed mathematically, $$\tau = 2R/C \tag{1}$$

where R is the range and C is the velocity of light. The interrogation signal is frequency modulated with a given modulation waveform; and the reflected signal as received at the interrogating unit is delayed in time, and hence shifted in frequency, from the instantaneous interrogation signal by an amount proportional to the range. For example, where a triangular waveform having a total frequency excursion of $\Delta F$ and a period of $1/f_m$ is used to frequency modulate the interrogation signal, the frequency shift or difference frequency $f_R$, as generated by a suitably filtered mixer, equal to the time derivative of the frequency of the interrogation signal times the round trip time delay, is:

$$f_R = \tau(df/dt) = 4(\Delta F)f_m R/C \tag{2}$$

Thus, the range between the target and the interrogating station may be computed by a measurement of frequency shift $f_R$.

Conventional processors measure the difference frequency by counting the number of zero crossings in the difference signal that occur within a fixed time interval. More specifically, the difference signal is applied to a counting circuit which develops a signal that is proportional to the rate of zero crossings.

However, the difference signal waveform undergoes periodic phase discontinuities at a rate of twice the frequency ($f_m$) of the modulation waveform of radar 10. For a description of such phenomenon reference is made to U.S. Pat. No. 3,968,492, issued July 6, 1976, to G. S. Kaplan and to U.S. Pat. No. 3,974,501, issued Aug. 10, 1976, to A. B. Ritzie, both assigned to the assignee of the present invention. It should be appreciated that the phase discontinuities cause the number of zero crossings occurring during a half cycle of the FM waveform to vary, resulting in an ambiguity in the indicated range. Such ambiguity is particularly evident in that a target receding from radar 10 by a distance equal to one quarter ($\frac{1}{4}$) wavelength of the transmitted signal frequency may, due to the variation in the number of zero crossings during the half FM waveform cycle, appear to advance toward the target.

This phenomenon can be an acute problem in systems operating on targets having complex or changing reflective surfaces. For a more detailed description of such phenomenon, reference is made to "Frequency Modulated Radar," D. G. C. Luck, Chapter 4, McGraw-Hill, 1949.

For a description of various methods to minimize quantization of the measured difference frequency due to the phase discontinuities reference is made to the above cited Kaplan and Ritzie patents.

There are, however, numerous applications in which during the desired range measuring period, the range increases or decreases monotonically, that is, without reversing directions. An example of such monotonic ranging is the measurement of the level of a material in a container as the container is being emptied. Such a measurement is often made in the operation of an iron blast furnace. The furnace is filled with "burden", a mixture of iron ore, coke, and limestone, and as the burden is melted to form molten iron, the level of the burden in the furnace decreases. When the level of the burden in the furnace decreases to a predetermined level, new burden is added through a gate located in the top of the furnace. Molten iron and slag are removed every 15 to 30 minutes from the bottom of the furnace.

Another such application is the monitoring of the drilling rate and depth of a drilling rig bit where during the drilling process, the drill bit continually penetrates deeper into a drilled material.

U.S. Pat. No. 4,072,947, issued Feb. 7, 1978, to H. C. Johnson and assigned to the assignee of the present invention, describes a simplified signal processor for reducing quantization error in such a monotonic FM-CW radar ranging system. Included in this processor is a first phase-locked loop (PLL) including a voltage-controlled oscillator (VCO), a phase comparator for comparing the average-axis or "zero" crossings of the oscillations with those of the frequency shift or difference frequency $f_R$, and a low-pass filter coupling the comparator output to the control circuit of the VCO to complete the phase-locked loop. The first PLL is a frequency-tracking filter. Choosing the cut-off frequency of the low-pass filter to be appreciably lower in frequency terms than the rate at which the radar CW is frequency-modulated allows the output frequency on average to track $f_R$, but will prevent its phase from exhibiting the phase discontinuities associated with $f_R$. While this method of eliminating phase discontinuities works reasonably well in practice, I have found that there are some aspects in which performance could be improved. In these systems a common antenna is used both for transmission of the radar CW and for reception of its reflection from target, a circulator being used to implement this. As the CW being transmitted sweeps through certain frequencies, the distance to target will be expressed in odd multiples of quarter wavelength; and the carrier wave will not propagate to be received as a strong reflection, i.e., there is a "phase cancellation" of received signal leading to the difference frequency ($f_R$) output from the mixer essentially disappearing. The mixer output is coupled to the first PLL by a chain of amplifiers and filters. This chain ends in wideband amplifiers which are driven into symmetrical limiting on peaks of $f_R$ signal to suppress noise by virtue of the capture phenomenon, except when phase cancellations occur. When $f_R$ disappears, the residual noise in the output signal from this chain pulls the PLL towards higher frequency, causing a so-called, "run-up" condition in which the range measurement errs towards being overlong. Phase cancellations of this severity—so-called "major" phase cancellations—occur only if axis of the radar beam is perpendicular to the surface of the target. Less severe "minor" phase cancellations occur where the surface is rough or does not fall in a plane to which the axis of the radar beam is perpendicular. During these minor phase cancellations the system noise is not well suppressed, and the first PLL is undesirably pulled in frequency by it.

SUMMARY OF THE INVENTION

I have found that modifying the frequency-tracking filter to include a level discriminator preceding the first PLL cures the problem of the first PLL receiving erroneous locking information during phase cancellation conditions. This level discriminator responds only to excursions of output signal, from the wide-band amplifiers for $f_R$, that depart from the average-level axis by more than a predetermined threshold value. During phase-cancellation conditions the amplified $f_R$ signal and accompanying noise does not reach this threshold level.

BRIEF DESCRIPTION OF THE DRAWING

The sole FIGURE of the drawing is a block diagram of an FM-CW radar using a frequency-tracking filter with my invention. Reference numerals corresponding to those in U.S. Pat. No. 4,074,947, are used to aid the reader in comparing this disclosure with Johnson's.

DETAILED DESCRIPTION OF THE DRAWING

Referring to the drawing, a conventional FM-CW radar 10 is coupled to a signal processor 12 using my invention. Signal processor 12 is, in turn, coupled to suitable utilization means 14, such as an indicator or triggering device.

FM-CW radar 10 is of conventional type, such as described in F. E. Nathanson, "Radar Design Principles," pp. 365–367, McGraw-Hill, 1969. As noted above, radar 10 generates an FM-CW probe signal, receives reflection from the target and mixes the reflected signal with a sample of the probe signal to generate an output signal, commonly referred to as the "difference signal," having a frequency indicative of the distance of a reflective target from the radar. Cooperative ranging systems, such as the harmonic system described in U.S. Pat. No. RE. 28,302 issued Jan. 14, 1975, to H. Staras and J. Sheffer, may also be utilized as radar 10. As noted above, the radar output signal undergoes periodic phase discontinuities at a rate of twice the frequency ($f_m$) of the modulation waveform of radar 10.

As in the radar described by Johnson, cited above, signal processor 12 includes first and second phase locked loops, 16 and 24 respectively, in cascade connection and a conventional frequency detector 40. The radar output signal is applied to first phase locked loop (PLL) 16 in a manner according to my invention, to be described in detail later in this specification. PLL 16 comprises conventional components; a phase comparator 18, a low-pass filter 20 and a voltage-controlled oscillator (VCO) 22. Comparator 18 and VCO 22 are commercially available as a single integrated circuit (IC), for example the RCA CD4046 COS/MOS Digital Integrated Circuit. Phase comparator 18 is receptive of the radar output signal and the output signal of VCO 22 and the output terminal thereof is coupled through low pass filter 20 to the control terminal of VCO 22.

PLL 16 comprises means for providing a signal having a frequency equal to the radar output frequency but without the phase inversions of the radar output signal. Phase comparator 18 generates a phase-error signal as its output signal, which is indicative of phase difference between the output signal of VCO 22 and the radar output signal. Low pass filter 20 is chosen to have a time constant such that the loop damping factor is long as compared to the radar modulation frequency ($f_m$). The periodic phase discontinuities in the output signal of radar 10 result in an elongated or foreshortened period in the signal, followed by a phase shift of the following periods. The periodic phase inversions of the radar output signal are manifested in the comparator (18) output signal, but are, in effect, averaged out over a large number of cycles of $f_m$ by the loop damping. The frequency of the VCO (22) output signal is varied in accordance with the output signal of filter 20. First PLL 16, therefore, operates to track the frequency of the radar output signal, generating an output signal having a continuous phase velocity at a frequency substantially equal to the radar output signal frequency.

The output signal of VCO 22, taken as the output signal of first PLL 16, is applied as an input signal to second PLL 24. PLL 24 comprises a phase comparator 26 and VCO 28, respectively, similar to phase comparator 18 and VCO 22 of PLL 16, and an integrator means 30, to be hereinafter described. Phase comparator 26 is receptive of the output signal of PLL 16 and of the output signal of VCO 28, and the output signal thereof is applied through filter circuit 30 to the control input of VCO 28. Integrator means 30 suitably comprises unilaterally conductive means (for example, a diode 32 and a resistor 34 in series connection) between the output terminal of phase comparator 26 and the control input terminal of VCO 28, and an integrator network (such as a capacitor 36 connected between the VCO 28 control input terminal and ground) cooperative with the unilaterally conductive means.

PLL 24 comprises a means, responsive to a signal of varying frequency, for generating an output signal having a frequency indicative of a predetermined frequency extremum of the varying frequency signal. More specifically, in the context of the radar ranging apparatus of the FIGURE PLL 24 generates an output signal having a frequency indicative of a predetermined frequency extremum of the radar output signal, that is, either the highest or lowest frequency attained by the radar output signal. Phase comparator 26 generates an output signal having an average amplitude indicative of the phase difference between the PLL (16) output signal and the output signal of VCO 28. Resistor 34 and capacitor 36 together comprise an integrator network, which accumulates a charge in accordance with those output signals of phase comparator 26 passed through diode 32. The voltage appearing in accordance with Coulomb's Law across capacitor 36 due to accumulated charge controls the frequency of the output signal of VCO 28. However, where VCO 28 has a positive transfer function, diode 32 is forward biased with respect to, and thus passes, only those output signals of phase comparator 26 having an amplitude greater than the potential across capacitor 36. Phase comparator 26 generates signals of relatively high average positive amplitude only when the output signal of PLL 16 is of higher frequency than the output signal of PLL 24. Since charge is accumulated in capacitor 36 only in response to phase comparator (26) output signals of amplitude capable of forward biasing diode 32, the output signal of VCO 28 tracks only positive-going frequency excursions in the radar output signal. Thus, the output signal of VCO 28, taken as the output signal of second PLL 24 is indicative of the highest value of frequency attained by the difference signal. It should be appreciated that PLL 24 can be made to generate an output signal indicative of the minimum frequency extremum of the radar output signal by reversing the polarity of diode 32 or, in some instances, by using an oscillator with frequency decreased by positive modulating voltage. It should be appreciated that PLL 16 operates to isolate PLL 24 from the phase discontinuities in the radar output signal by generating a continuous phase velocity output signal. The frequency of such signal, however, still manifests the quantization error. PLL 24, by tracking frequency excursions in one direction only, eliminates the above described spurious frequency excursion in the opposite direction caused by the variation in number of zero crossings. Isolation of PLL 24 from the phase discontinuities in the radar 10 output signal is necessary to prevent capacitor 36 from erroneously accumulating charge in response to each foreshortened period in the radar output signal.

The output signal of the second PLL 24 is applied to frequency detector 40. Frequency detector 40 is suitably a frequency-to-analog converter, or a zero crossing detector cooperating with a counter. For a description of a suitable frequency detector 40 reference is made to the aforementioned "Frequency Modulated Radar" by D. G. C. Luck.

When the range of the target has reached a predetermined threshold value, for example as determined by utilization means 14, the charge on capacitor 36 is reset by a resetting means 38, to a predetermined level. Resetting means 38 is suitably a switched voltage source or a switched electrical path to ground.

A signal processor 12, in accordance with the present invention, has been built for use in conjunction with a conventional ranging type FM-CW radar and used to measure the burden height in an iron producing blast furnace. The radar transmits a probe signal which is triangularly modulated at 700 Hz rate, has a center r. f. frequency of about 10.5 GHz, and has a total frequency deviation of 150 MHz. In this application, two RCA CD 4046 integrated PLL oscillators were respectively utilized in PLL 16 and PLL 24. A 1N914 diode used in PLL (24) provides for monotonic tracking. The output signal of PLL (24) is used to trigger a monostable multivibrator (one shot), the output pulses of which are averaged and displayed on a digital panel meter calibrated in feet. Errors of no more than two inches are to be expected in the measurement of the burden height.

Consider now how the mixer output signal, $f_R$, from radar 10 is applied to phase comparator 18 in the first PLL 16, which is the matter of particular concern with regard to my invention. The mixer output signal $f_R$ is applied to the input circuit of an amplifier 51, the output circuit of which drives a bandpass filter 52 which limits the frequency range over which there is response to the mixer output signal. The antenna of the radar unit 10 is mounted at least fifteen feet above the highest level of the burden. An 8 kHz limitation upon low-frequency response is provided by filter 52 reflective of the fact that there is no need to respond to ranges less fifteen feet. The desire to maintain optimum furnace performance places limitations on how far the burden is allowed to descend before the blast furnace is filled again; and there are, of course, practical limits on how high the radar unit can be mounted in the furnace. A 37 kHz limitation is provided on the high-frequency response of filter 52 since ranging capability beyond 50 feet will never be required. The filtered output signal from the output circuit of bandpass filter 52 is applied to the input circuit of an amplifier 53, the output circuit of which drives a low-pass filter 54 having a 40 kHz limitation on high-frequency response. This cascade of frequency-domain filters reduces the likelihood of high-frequency transients in the mixer output signal pulling the output frequency of the frequency tracking filter upwards and causing a range measurement that is too long.

The output circuit of the low-pass filter 54 is then applied to the input circuit of an amplifier 55, followed in cascade by amplitude-limiting amplifier 56. Amplifiers 51, 53, 55 and 56 are, in the particular system being described, operational amplifiers constructed using the RCA CA3100 integrated circuit. The level of signals in the cascade or chain comprising amplifier 51, filter 52, amplifier 53, filter 54 and amplifiers 55 and 56 is such that the mixer output signals, except during phase-cancellations, drive amplitude-limiting amplifier 56 sufficiently hard that its output signal voltage is symmetrically limited with $\pm 7.3$ volts swing about its average-level axis of 7.5 volts. This limiting of amplitude provides the rectangular waves necessary as input for phase comparator 18 of the PLL circuit, which comparator compares the edges of applied input pulse signals to those of VCO 22 to generate the signal that controls the frequency of VCO 22. This amplitude limiting is time-domain filtering which, so long as the mixer output signal is sufficiently strong, suppresses the noise generated in the chain 51, 52, 53, 54, 55, 56 by the "capture" phenomenon well known in the FM wave receiver art.

During phase cancellations when amplitude-limiting amplifier 56 is not driven into limiting, however, this noise is not suppressed; and, as previously noted, it is desirable to prevent the application of this noise to the first PLL 16 to avoid error in the frequency-tracking filter built around PLL 16. This is done in accordance with my invention by interposing level discriminator 60 between the output circuit of amplifier 56 and the input circuit of the first PLL 16. Level discriminator 60 applies output pulses to PLL 16 only when the output signal from amplifier 56 is limited or close to being limited. The particular level discriminator 60 shown provides output pulses responsive to negative excursions of the output signal of amplifier 56 respective to its average-level axis and is of particularly simple construction, but other forms of level discriminator can be used. The level discriminator may provide output pulses responsive to positive excursions of the output signal of amplifier 56 respective to its average-level axis; an example of such level discriminator being a structure similar to that of level discriminator 60 but using a PNP transistor and negative operating supply voltage, rather than the NPN transistor 61 and positive operating supply voltage B+, and using a Schmitt trigger with triggering levels appropriately modified from those of Schmitt trigger 62.

Let us now consider the construction and operation of level discriminator 60 in greater detail. The output signal from amplifier 56, of square-wave form when there are no phase-cancellations and amplifier 56 is driven into limiting, passes through a d-c blocking capacitor 63 to have its average-level axis re-referenced to a new voltage. This new voltage is determined by the resistive potential divider action of resistors 64 and 65. The resistances of resistors 64 and 65 are so chosen that this new voltage appreciably exceeds the voltage required to bias the emitter-base junction of transistor 61 into conduction. (That is, this new voltage appreciably exceeds 0.7 volts presuming transistor 61 to be silicon transistor.) The variations in output signal from amplifier 56 superimposed on this new average-level axis voltage are applied to the base of grounded-emitter transistor 61 via resistor 66. Resistor 66 is sufficiently high in resistance compared to the paralleled resistances of resistors 64 and 65 to prevent the emitter-base junction of transistor 61 from clamping the voltage at the interconnection of resistors 64 and 65 to ground, which non-linear action would adversely affect the superposition of the variations in output signal from amplifier 56 on a new average-level axis.

Transistor 61 is maintained conductive, to develop a potential drop across its collector resistor 67, except when limited signal output is available from amplifier 56, which limited signal output exhibits negativeward excursions sufficient in amplitude to reverse-bias the emitter-base junction of transistor 61. Accordingly, the collector voltage of transistor 61 will exhibit pulses extending positiveward from near ground potential to B+ operating voltage responsive to those negativeward excursions of sufficient amplitude to reverse-bias its emitter-base junction. Since the frequency of the pulses being handled is quite low, resistor 67 may be chosen of sufficiently high resistance that transistor 61 saturates when conductive. Measures, such as doping of transistor 61 to reduce lifetime of carriers therein or Schottky- diode clamping of collector to base, may be employed to speed recovery from saturation, if necessary. Schmitt trigger 62 responds to the collector voltage of transistor 61 approaching ground to change its output voltage applied as input to phase comparator 18; Schmitt trigger 62 is used to improve the steepness of the pulse edges applied to phase comparator 18 and can be omitted if measures to speed recovery of transistor from saturation are employed, or if the collector of transistor 61 is clamped to prevent forward conduction over its collector-base junction.

When the output signal from amplitude-limiting amplifier 56 is not into limiting, nor close to it, the variations in this signal superimposed on the average-level axis voltage at the inter-connection of resistors 64 and 65 do not swing close enough to ground, or past it in the negative direction, so as to bias transistor 61 out of conduction. Under these circumstances no pulses appear at the collector of transistor 61 to be coupled to phase comparator 18. In the absence of pulses to update the phasing of PLL 16 its frequency tends to remain constant at the value previously determined by phase comparator 18, so the "run-up" condition does not obtain.

What is claimed is:

1. A frequency-tracking filter comprising:
    means responsive to a signal the frequency of which is to be tracked for symmetrically amplitude-limiting said signal about an average-level axis;
    a level discriminator coupled to said limiting means to provide discriminator output signals only if said signals depart from said average-level axis by more than a predetermined threshold value;
    a controlled oscillator generating output signal at a frequency determined by a control signal;
    means coupled to said discriminator and said oscillator for comparing the phase of said oscillator output signal and the said discriminator output signal to provide a phase-error signal indicative of their phase of difference; and
    means responsive to only those components of said phase-error signal below a predetermined cut-off frequency for providing said control signal to said oscillator.

2. Apparatus for measuring frequency comprising, in combination, a frequency-tracking filter as set forth in claim 1, and a frequency detector coupled to said oscillator to receive output signals therefrom.

3. In combination with apparatus for measuring frequency as set forth in claim 2, a frequency modulated continuous-wave radar including:
    means for transmitting a frequency-modulated carrier wave;
    means for receiving its reflection from a target; and
    means for mixing said frequency-modulated wave and its reflection to provide a difference signal indicative of the range of said target; and
    means for applying said difference signal to said means for symmetrically amplitude limiting, as said signal the frequency of which is to be tracked.

* * * * *